R. LAHAUSSOIS.
GAS PRODUCER FOR GENERATING RICH GASES.
APPLICATION FILED FEB. 8, 1912.
1,068,788. Patented July 29, 1913.
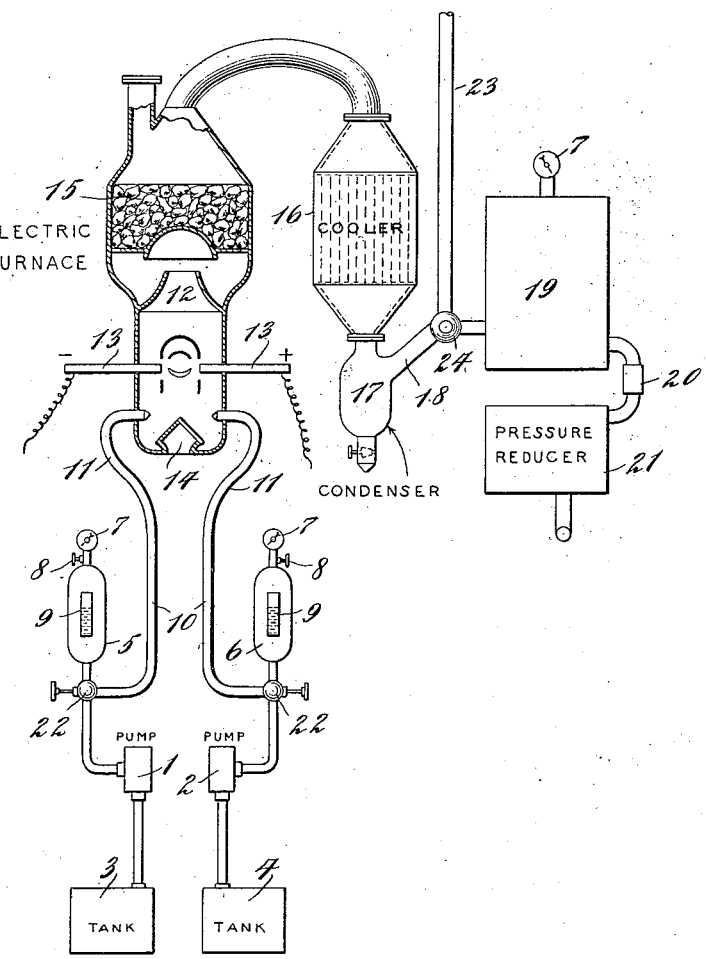

UNITED STATES PATENT OFFICE.

RENÉ LAHAUSSOIS, OF PARIS, FRANCE.

GAS-PRODUCER FOR GENERATING RICH GASES.

1,068,788. Specification of Letters Patent. Patented July 29, 1913.

Application filed February 8, 1912. Serial No. 676,430.

*To all whom it may concern:*

Be it known that I, RENÉ LAHAUSSOIS, citizen of the French Republic, residing at Paris, in the Department of the Seine, France, have invented certain new and useful Improvements in Gas-Producers for Generating Rich Gases, of which the following is a specification.

This invention has for its object to provide a producer for the generation of rich gases produced by treating liquid fuels, which are not very volatile, for working gas engines.

The principle underlying the design of this generator for rich gases consists in passing through an electric arc a mixture of not very volatile combustible liquid and water, both in the pulverized state, so that the decomposition of these substances into their constituent elements and their reconstitution in accordance with their chemical affinities produce after this first passage and a second passage through a layer of incandescent coal, an exceedingly rich gas, rich mainly in carbon monoxid.

This producer operating on the above stated principle is illustrated diagrammatically in the accompanying drawing.

It is obvious that modifications may be made in this apparatus as regards the construction of the details of the constituent parts and also as regards their individual and general arrangement and construction, without departing from the nature of the invention.

As shown in the drawing, the complete arrangement of this producer of rich gases is as follows: Two pumps 1 and 2 of any kind, driven either by the motor which is fed by the producer or by other means, draw respectively water into a tank 3, and the liquid fuel, for instance a mixture of naptha and tar, into a tank 4. This water and this mixture are delivered separately under suitable pressure, for instance 4-5 kgs., into flasks 5 and 6, each of which is fitted with a pressure gage 7, a valve 8 and a water gage 9. The water and the mixture of naphtha and tar are led through pipes 10 and forced through injectors 11 provided with needles or other devices for regulating delivery, into an electric furnace 12 having preferably four carbons 13. The two liquid jets coming from the injectors 11 are directed on to a faceted button 14, which is designed to deflect the said jets and to direct them, while mixing them together, on to the electric arc.

Owing to the high temperature in the interior of the electric furnace 12, which may be constructed in any desired manner and of the most suitable refractory materials, the pulverized mixture of water and the not very volatile liquid fuel is vaporized and decomposed into its primary elements, which then recombine at once in accordance with certain chemical affinities resulting chiefly in the production of oxygen, carbonic anhydrid and carbon. On leaving the furnace 12, these gases at a high temperature pass through a chamber 15 that is filled with incandescent coal, from which they pass out almost completely converted into carbon monoxid, which is cooled in a cooler 16 and passes into a condenser 17, whence the gas continues its way through a pipe 18 into a gas holder 19, where it accumulates under a certain pressure and whence it can be delivered by means of a pressure reducing device 20 into a second holder 21, whence it is drawn by the engine. The condenser 17 in which the excess tar and water accumulate, serves also as a means for indicating the progress of the operation for the purpose of regulating the water or the liquid fuel in suitable quantities, this regulation being effected by means of two-way cocks 22 arranged between the pumps 1 and 2 and the flasks 5 and 6.

An escape pipe 23 serves for the discharge of any excess production of gas and is connected to the condenser by means of a two-way cock 24.

It is obvious that the manner of driving or operating the various controlling devices for regulating the admission, the delivery, the exhaust, etc., may be effected in any suitable ways and either by hand or automatically.

What I claim is:

An apparatus of the character described comprising, in combination, a decomposition chamber, a deflecting plate therein, jets adapted to direct water and a fuel of low volatility on said plate, an arc in said chamber, said water and vapor being adapted to flow as a mixture past said arc and to be thereby decomposed, a second chamber adapted to be provided with incandescent coal, a conduit between said first-mentioned and said second-mentioned chambers, the products of decomposition of said water and said fuel being adapted to pass from said arc through said conduit and through said coal.

In testimony whereof I affix my signature in presence of two witnesses.

RENÉ LAHAUSSOIS.

Witnesses:
H. C. COXE,
LUCIEN CRESPIN.